United States Patent
Meerbeek et al.

(10) Patent No.: US 11,743,993 B2
(45) Date of Patent: Aug. 29, 2023

(54) LIGHTING CONTROLLER FOR CONTROLLING A LIGHT SOURCE AND A METHOD THEREOF

(71) Applicant: SIGNIFY HOLDING B.V., Eindhoven (NL)

(72) Inventors: Berent Willem Meerbeek, Veldhoven (NL); Kevin Thomas Worm, Eindhoven (NL); Gerhardus Engbertus Mekenkamp, Valkenswaard (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 154 days.

(21) Appl. No.: 17/437,527

(22) PCT Filed: Mar. 2, 2020

(86) PCT No.: PCT/EP2020/055422
§ 371 (c)(1),
(2) Date: Sep. 9, 2021

(87) PCT Pub. No.: WO2020/182514
PCT Pub. Date: Sep. 17, 2020

(65) Prior Publication Data
US 2022/0167485 A1   May 26, 2022

(30) Foreign Application Priority Data
Mar. 14, 2019 (EP) .................... 19162902

(51) Int. Cl.
*H05B 47/16* (2020.01)
*H05B 45/20* (2020.01)

(52) U.S. Cl.
CPC ............ *H05B 47/16* (2020.01); *H05B 45/20* (2020.01)

(58) Field of Classification Search
CPC ........ H05B 45/10; H05B 45/20; H05B 47/10; H05B 47/16; H05B 47/165
See application file for complete search history.

(56) References Cited

U.S. PATENT DOCUMENTS

| | | |
|---|---|---|
| 2014/0104321 A1 | 4/2014 | Steffy |
| 2017/0105265 A1* | 4/2017 | Sadwick ................ H05B 47/11 |
| 2018/0014392 A1 | 1/2018 | Charlton et al. |

FOREIGN PATENT DOCUMENTS

| | | |
|---|---|---|
| WO | 2012172470 A1 | 12/2012 |
| WO | 2015063644 A1 | 5/2015 |
| WO | 2017148767 A1 | 9/2017 |

* cited by examiner

*Primary Examiner* — Jimmy T Vu

(57) ABSTRACT

A method and a lighting controller for controlling a light source are disclosed. The lighting controller comprises: an input configured to receive signals indicative of user inputs, a processor configured to determine a current time, select a light setting from a predefined sequence of light settings when a first signal indicative of a first user input has been received, wherein the selection of the light setting is based on the current time, control the light source according to the selected light setting, and select a subsequent light setting from the predefined sequence of light settings when a subsequent signal indicative of a subsequent user input has been received, wherein the subsequent light setting is a light setting subsequent to the light setting, and control the light source according to the subsequent light setting.

14 Claims, 4 Drawing Sheets

LIGHTING CONTROLLER FOR CONTROLLING A LIGHT SOURCE AND A METHOD THEREOF

CROSS-REFERENCE TO PRIOR APPLICATIONS

This application is the U.S. National Phase application under 35 U.S.C. § of International Application No. PCT/EP2020/055422, filed on Mar. 2, 2020, which claims the benefit of European Patent Application No. 19162902.1, filed on Mar. 14, 2019. These applications are hereby incorporated by reference herein.

FIELD OF THE INVENTION

The invention relates to a lighting controller for controlling a light source and to a user input device for controlling a light source. The invention further relates to a method of controlling a light source and to a computer program product for executing the method.

BACKGROUND

Current smart lighting systems allow a user to control lighting devices via different types of control interfaces. One of these control interfaces is a software application running on a smartphone, pc, tablet, etc. This provides a user a rich user interface with multiple options for lighting control. Another type of control interface uses an accessory device, such as a light switch. Such a light switch provides more limited lighting control options. For example, a light switch may comprise a limited number of buttons or other user input elements. For instance, a light switch may comprise an off-button that enables a user to switch one or more lighting devices off, an on-button that enables the user to switch the one or more lighting devices on, and two buttons for increasing and decreasing the intensity of the light. In another example, a light switch may comprise only a single button enabling a user to turn the light on or off. Some of these light switches further enable a user to touch/press the on-button multiple times to cycle through a plurality of predefined light settings to control lighting devices according to these light settings.

US 2018/0014392 A1 discloses a lighting control device which includes a switch module including a light switch actuator and a tactile display housed in the light switch actuator. When activated or energized, the tactile display allows a user to define or select predefined lighting settings where the lighting settings change the voltage or power supplied to one or more light fixtures. The change in power supplied to the light fixtures may include a plurality of different voltages supplied to each fixture and may be based on various parameters including time of day. A lighting control device transitions through various lighting settings. A transition is facilitated via a user completing swiping gesture across a tactile display, and the tactile display toggles to a new light setting shown.

SUMMARY OF THE INVENTION

The inventors have realized that selecting light settings with existing lighting control interfaces comprising one or more buttons may be cumbersome, because it requires a user to press buttons multiple times to cycle through light settings to select the desired light setting. It is therefore an object of the present invention to provide an improved, user friendly light setting selection mechanism.

According to a first aspect of the present invention, the object is achieved by a lighting controller for controlling a light source, the lighting controller comprising:

an input configured to receive signals indicative of user inputs, a processor configured to determine a current time, select a light setting from a predefined sequence of light settings when a first signal indicative of a first user input has been received, wherein the selection of the light setting is based on the current time, control the light source according to the selected light setting, and select a subsequent light setting from the predefined sequence of light settings when a subsequent signal indicative of a subsequent user input has been received, wherein the subsequent light setting is a light setting subsequent to the light setting, and control the light source according to the subsequent light setting.

The processor selects a light setting of a predefined sequence of light settings based on the current time (of the day) when the first signal has been received, i.e. when a first user input has been provided by a user. Additionally, the processor selects a subsequent light setting of the same predefined sequence if a subsequent signal has been received, i.e. when a subsequent user input has been provided by the user. Each of the predefined sequence of light settings may be associated with a time of day, and the processor may select the light setting of the sequence based on the current time of day. Additionally, when the user provides the subsequent user input after the first user input, a subsequent scene of the sequence is selected by the processor. This is beneficial, because a user may expect a certain light setting to be selected after a previous (first) light setting has been selected. Therefore, an improved, user friendly lighting controller is provided.

The processor may be further configured to select a second subsequent light setting from the predefined sequence of light settings when a second subsequent signal indicative of a second subsequent user input has been received, wherein the second subsequent light setting is a light setting subsequent to the subsequent light setting. This enables a user to cycle through the light settings of the sequence by providing multiple subsequent user inputs.

The first user input and the subsequent user input may have been received via the same user input element. The user input element may be comprised in a user input device such as a light switch. The user input element may, for example, be a button, such as a touch or press button. This enables a user to provide the first user input by pressing/touching the button to actuate the first light setting associated with the current time of day, and subsequently provide the subsequent user input by pressing/touching the same button to select the next (subsequent) light setting of the sequence.

Alternatively, the first user input may have been received via a first user input element, and the subsequent user input may have been received via a second user input element. The first and second user input elements may be comprised in the same user input device (e.g. a light switch, or a lighting control panel). Alternatively, first and second user input elements may be comprised in a first user input device and a second user input device, respectively. The first user input element may, for example, be a (touch or press) button, and the second user input element may, for example, be a rotary button. This enables a user to provide the first user input by pressing/touching the button to actuate the first light setting associated with the current time of day, and subsequently provide the subsequent user input by rotating the rotary button to select the next (subsequent) light setting of the sequence. The rotary button may be configured to receive rotary input in different directions (clockwise and counterclockwise). Based on the direction of the rotation, a user may select a subsequent light setting of the predefined sequence, or a previous light setting of the predefined sequence.

The predefined sequence of light settings may be a periodic sequence of light settings. In other words, the predefined sequence of light settings may be a cyclic sequence of light settings, enabling a user to cycle though the light settings of the sequence by providing one or more subsequent user inputs, wherein after a "last" light setting the first light setting of the sequence is actuated.

The light settings of the predefined sequence of light settings may correspond to a predefined circadian light cycle. Each light setting of the predefined circadian light cycle may have a spectrum that corresponds to a spectrum of the daylight at a respective time of day. This may be beneficial, because when the user provides the first user input, a light setting is selected that corresponds to the spectrum of the daylight and therewith to the circadian rhythm of the user. The user may then provide the subsequent user input to select a subsequent light setting that may correspond to the spectrum of the daylight at a later time of the day. This may be beneficial if a user wishes to adjust his or her circadian light cycle. The user can adjust his or her circadian rhythm by providing one or more subsequent user inputs. This may further be beneficial when the user desires to be energized by the light (e.g. blue light in the early morning instead of during mid-day) or to be de-energized by the light (e.g. orange light in the afternoon instead of in the evening).

The light settings of the predefined sequence of light settings may be defined by a user. The user may, for example, set the predefined sequence via a user interface, e.g. via an application running on a smartphone. This is beneficial because it enables a user to determine the sequence.

The light settings of the predefined sequence of light settings may be defined based on an analysis of historical light setting control. Historical user data may be logged to determine favorite or preferred light settings at certain moments in time. This may be based on light setting selection patterns of the user. This enables defining the predefined light settings based on the historical behavior of the user, which is beneficial because the predefined sequence is tailored to the needs of the user.

The processor may be configured to select the subsequent light setting if the subsequent signal has been received within a predefined time period after the first signal has been received. The predefined time period may, for example, be 1000 ms, 2000 ms, 5000 ms, etc. Such a time period may be beneficial if the number of user input elements is limited, for instance when the subsequent light setting is to be selected with the same user input element as the first light setting. When the subsequent user input may be received via a second user input element, the time period may be longer, e.g. minutes or hours.

The processor may be further configured to select a second light setting from the predefined sequence of light settings when the subsequent signal has been received after the predefined time period. The selection of the second light setting may be based on the time when the subsequent signal has been received. If the user does not provide the subsequent user input within the predefined time period, the processor may select a light setting based on the (new) time (of day) at which the subsequent user input has been received. Alternatively, the processor may be further configured to deactivate the light setting (i.e. switch the light off) when the subsequent signal has been received after the predefined time period.

According to a second aspect of the present invention, the object is achieved by a user input device comprising the lighting controller according to any above-mentioned lighting controller, and one or more user input elements configured to receive the user inputs.

According to a third aspect of the present invention, the object is achieved by a method of controlling a light source, the method comprising:
  determining a current time,
  receiving a first signal indicative of a first user input,
  selecting a light setting from a predefined sequence of light settings when the first signal has been received, wherein the selection of the light setting is based on the current time,
  controlling the light source according to the selected light setting,
  receiving a subsequent signal indicative of a subsequent user input,
  selecting a subsequent light setting from the predefined sequence of light settings when the subsequent signal has been received, wherein the subsequent light setting is a light setting subsequent to the light setting, and
  controlling the light source according to the subsequent light setting.

According to a fourth aspect of the present invention, the object is achieved by a computer program product for a computing device, the computer program product comprising computer program code to perform the method when the computer program product is run on a processing unit of the computing device.

It should be understood that the user input device, the method and the computer program product may have similar and/or identical embodiments and advantages as the above-mentioned lighting controllers.

BRIEF DESCRIPTION OF THE DRAWINGS

The above, as well as additional objects, features and advantages of the disclosed systems, devices and methods will be better understood through the following illustrative and non-limiting detailed description of embodiments of devices and methods, with reference to the appended drawings, in which.

All the figures are schematic, not necessarily to scale, and generally only show parts which are necessary in order to elucidate the invention, wherein other parts may be omitted or merely suggested.

DETAILED DESCRIPTION OF EMBODIMENTS

Figure 1A:
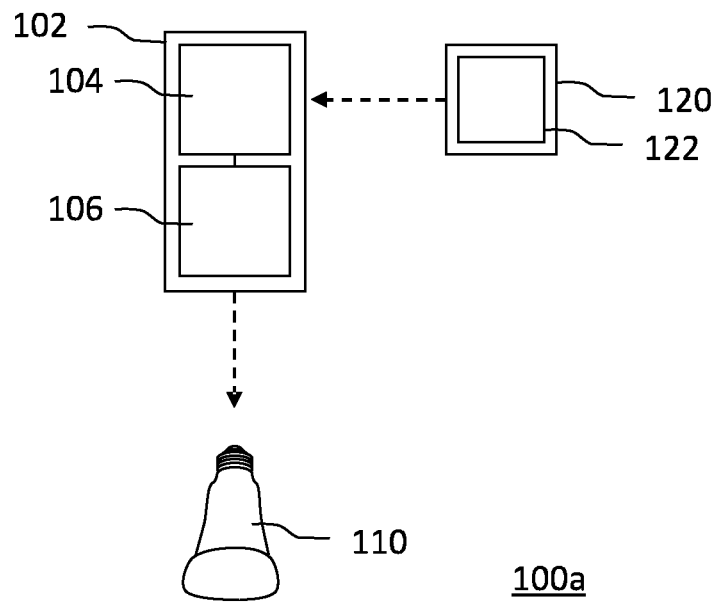
FIGS. 1a and 1b show schematically embodiments of a system comprising a lighting controller for controlling a light source.
Figure 1B:
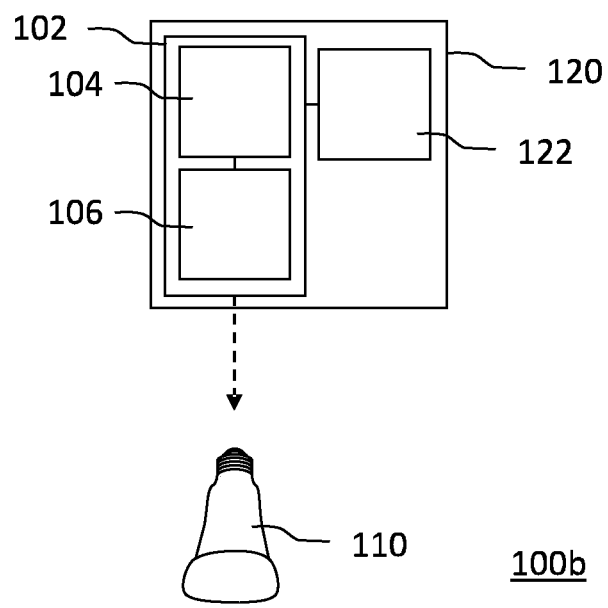

FIGS. 1a and 1b show exemplary systems 100a, 100b comprising a lighting controller 102 for controlling a light source 110 based on user inputs received from one or more user input elements 122 of one or more input devices 120. In the example of FIG. 1a, the user input device 120 and the controller 102 are different devices. The lighting controller 102 may, for example, be comprised in a smartphone, in a bridge device, in a central home/lighting control system, on a remote server (e.g. in the cloud), etc. Alternatively, as illustrated in FIG. 1b, the controller 102 may be comprised in the user input device 120. The controller 102 comprises an input 104 configured to receive signals indicative of user inputs, and a processor 106 (e.g. a microcontroller, circuitry, a microchip, etc.).

The processor 106 is configured to determine/obtain a current time. The processor 106 is further configured to select a light setting from a predefined sequence of light settings when a first signal indicative of a first user input has been received, wherein the selection of the light setting is based on the current time, and to control the light source 110 according to the selected light setting. The processor 106 is further configured to select a subsequent light setting from the predefined sequence of light settings when a subsequent signal indicative of a subsequent user input has been received, wherein the subsequent light setting is a light setting subsequent to the light setting, and to control the light source 110 according to the subsequent light setting.

The light source 110 is configured to receive (wireless) signals (e.g. lighting control signals) from the lighting controller 102. The (wireless) signals may be received directly from the lighting controller 102 or via an intermediary device such as a bridge, a hub, a router, or another network device. The lighting controller 102 may comprise a communication unit configured to communicate control commands via any wired or wireless communication protocol (e.g. Ethernet, DALI, Bluetooth, Wi-Fi, Li-Fi, Thread, ZigBee, etc.). The light source 110 (e.g. an LED light source) is comprised in a lighting device (e.g. a light bulb, an LED strip, a TLED, a light tile, etc.), which may comprise one or more additional light sources. The lighting device may comprise a control unit, such as a microcontroller (not shown), for controlling the light output generated by the light sources based on received lighting control commands. A control command may comprise a light setting (e.g. the (first) light setting or the subsequent light setting) for controlling the light output. Each light setting may relate to light properties such as the color, intensity, saturation, beam size, beam shape, etc. according to which the light source 110 is controlled. The light setting may be indicative of a dynamic light scene, wherein one or more light properties of the light source 110 change over time.

The lighting controller 102 comprises the input 104 configured to receive signals indicative of user inputs. In the example of FIG. 1a, wherein the user input device 120 and the controller 102 are comprised in separate devices, the input 104 may be a receiver configured to receive (wireless) signals from the user input device 120. The receiver may be coupled to the processor 106 and communicate the received signals to the processor 106. In the example of FIG. 1b, wherein the controller 102 is comprised in the user input device 120, the input 104 may for example be an input module of the processor 106 located between the user input element 122 and the processor 106.

The processor 106 is configured to determine or obtain a current time. The lighting controller 102 may comprise an internal clock for providing the time to the processor 106. Alternatively, the processor 106 may receive the current time from an external clock (e.g. via a network via the input 104).

The processor 106 is further configured to select a light setting from a predefined sequence of light settings when the first signal indicative of the first user input has been received. The processor 106 may, for example, be configured to access a (remote) memory storing a lookup-table comprising the predefined sequence of light settings, each associated with a respective time (of day). Table 1 illustrates an example of such a table. In this example, the RGB values of the light settings substantially correspond to the color temperature of daylight of a circadian light cycle.

TABLE 1

| Time | Light setting |
| --- | --- |
| 06:00-08:00 | 1: RGB [255, 197, 143] |
| 08:00-12:00 | 2: RGB [255, 250, 244] |
| 12:00-15:00 | 3: RGB [255, 255, 251] |
| 15:00-18:00 | 4: RGB [255, 241, 224] |
| 18:00-23:00 | 5: RGB [255, 147, 41] |

When a user provides an input via the user input element 122 of the user input device 120, the processor 106 receives the first signal indicative thereof. The processor 106 may then compare the current time (e.g. 10:00) with the table and select the light setting that associated with the current time (in this example light setting 2: RGB [255, 250, 244]). The processor 106 is further configured to control the light source 110 according to that light setting by communicating a lighting control command to the light source 110 (e.g. via the communication unit).

If the user provides a subsequent user input, either at the same user input element 122 or at a different user input element (which may be comprised in the same user input device 120 or in a different user input device), the processor 106 receives the subsequent signal indicative thereof. The processor 106 then selects a subsequent light setting from the predefined sequence of light settings (see Table 1), wherein the subsequent light setting is a light setting subsequent to the (first) light setting in the sequence. Referring to the example of Table 1, this would result in a selection of light setting 3: RGB [255, 255, 251]. The processor 106 is further configured to control the light source 110 according to that light setting by communicating a lighting control command to the light source 110 (e.g. via the communication unit).

The processor 106 may be further configured to select a second subsequent light setting from the predefined sequence of light settings when a second subsequent signal indicative of a second subsequent user input has been received, wherein the second subsequent light setting is a light setting subsequent to the subsequent light setting (referring to Table 1 and the above-mentioned example, this would result in selection of light setting 4: RGB [255, 241, 224]). This enables a user to cycle through the light settings of the sequence (of Table 1) by providing multiple subsequent user inputs.

The user input device 120 may be any type of user input device (e.g. a light switch, a presence or motion sensor, a microphone, a touch-sensitive display, a gesture sensor, etc.) configured to receive user inputs indicative of a selection of a light setting. The first user input and the subsequent user input may be received via the same user input element 122 of a user input device 120. Alternatively, the first user input may be received via a first user input element, and the subsequent user input may be received via a second user input element. The first and second user input elements may be comprised in the same or in different user input devices.

The first and second user input elements may be of the same type (e.g. both buttons) or of different types (e.g. a presence sensor and a push/touch button, or a push/touch button and a rotary button).

In a first example, the user input device 220a may comprise a single user input element 222a, for example a single button. A user may press the button 222a of the light switch 220a (illustrated in FIG. 2a) to activate the first light setting associated with that time of day. Then the user may provide the subsequent user input by pressing the button 222a a second time, whereupon the processor 106 selects the subsequent light setting.

In a second example, the user input device may comprise a microphone configured to receive voice input. A user may provide a voice input (e.g. "turn on the lights") to activate the first light setting associated with that time of day. Then the user may provide the subsequent user input by providing a second voice input (e.g. "next light setting"), whereupon the processor 106 selects the subsequent light setting.

In a third example, the user input device 220b may comprise a first user input element 222b, for example a button, and a second user input element 224b, for example a rotary button/dial. A user may press the button 222b of the light switch 220b (illustrated in FIG. 2b) to activate the first light setting associated with that time of day. Then the user may provide the subsequent user input by rotating the rotary button 224b (e.g. clockwise), whereupon the processor 106 selects the subsequent light setting. In embodiments, the rotary button may also be used to cycle through previous light settings of the sequence by providing a rotary user input in the opposite direction.

Figure 2A:
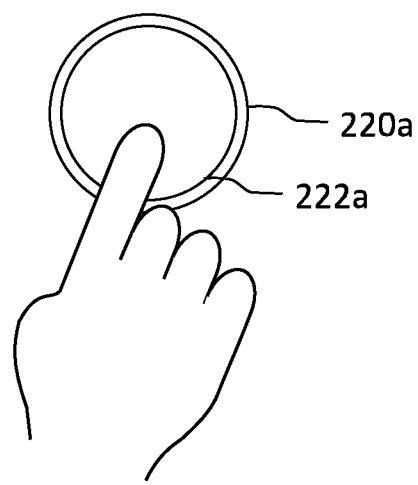
FIGS. 2a and 2b show schematically embodiments of user input devices.
Figure 2B:
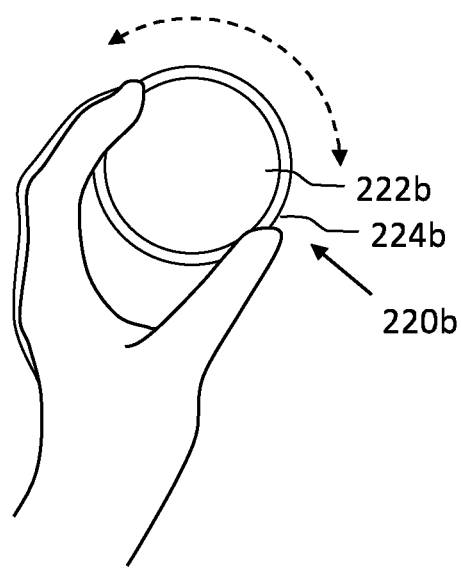

In a fourth example, a first user input device may comprise a first user input element, and a second user input device may comprise a second user input element. The first user input device may, for example, be a light switch as illustrated in FIG. 2a comprising first a user input element 222a (e.g. a button). A user may press the button, whereupon the processor selects the first light setting associated with the current time of day. The second user input device may, for example, be rotary button as illustrated in FIG. 2b. The user may provide the subsequent user input by rotating the rotary button, whereupon the processor 106 selects the subsequent light setting.

In a fifth example, a first user input device may comprise a first user input element, and a second user input device may comprise a second user input element. The first user input device may, for example, be a presence sensor comprising a presence sensor as a first user input element (e.g. an ultrasound sensor, an infrared sensor, an RF sensor, etc.). The presence sensor may be triggered by a user, whereupon the processor selects the first light setting associated with the current time of day. The second user input device may, for example, be a light switch or a microphone. The user may provide the subsequent user input via the button or the microphone, whereupon the processor 106 selects the subsequent light setting.

It should be understood that the above-mentioned examples are mere examples, and that the skilled person is able to conceive other types and combinations of user input devices and user input elements without departing from the scope of the appended claims.

The predefined sequence of light settings may be a periodic sequence of light settings. In other words, the predefined sequence of light settings may be a cyclic sequence of light settings, enabling a user to cycle through the light settings of the sequence by providing one or more subsequent user inputs. If, for example, referring to Table 1, a user would provide a subsequent user input when light setting 5: RGB [255, 147, 41] is active, the processor 106 may select light setting 1: RGB [255, 197, 143] as the subsequent light setting.

The light settings of the predefined sequence of light settings may correspond to a predefined circadian light cycle. FIG. 3b illustrates a sequence of light settings s1-s6 that correspond to a circadian light cycle. Each light setting is associated with a respective moment in time t1-t6. Each light setting of the predefined circadian light cycle may have a spectrum that corresponds to a spectrum of the daylight at a respective time of day. The color temperature and/or the brightness of the light settings may correspond to the daylight spectrum. Thus, when the user provides the first user input, a light setting is selected that corresponds to the spectrum of the daylight and therewith to the circadian rhythm of the user. The user may then provide the subsequent user input to select a subsequent light setting that may correspond to the spectrum of the daylight at a later time of the day. This may be beneficial if a user wishes to adjust his or her circadian light cycle/rhythm. This may be beneficial when the user desires to be energized by the light (e.g. blue light in the early morning) or to be de-energized by the light (e.g. orange light in the afternoon). The effects of light on a user's circadian rhythm (e.g. melatonin suppression with blue light and melatonin production with red light) are known in the art and will therefore not be discussed in detail.

The light settings of the predefined sequence of light settings may be defined by a user. The user may, for example, set the predefined sequence via a user interface, e.g. via an application running on a smartphone. This is beneficial because it enables a user to determine the sequence.

Figure 3A:
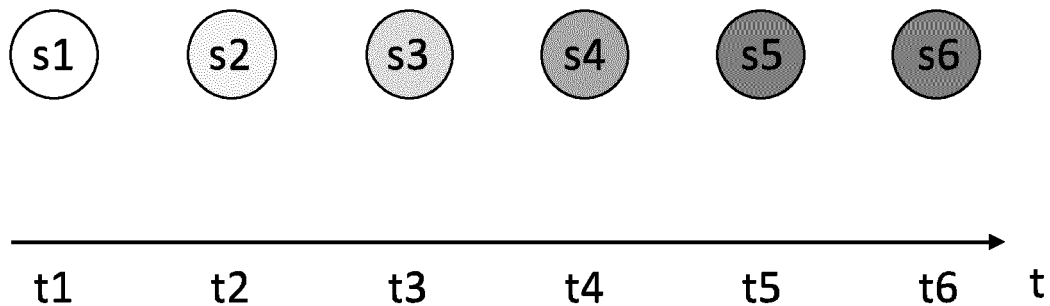
FIGS. 3a and 3b show schematically timelines associated with sequences of light settings.
Figure 3B:
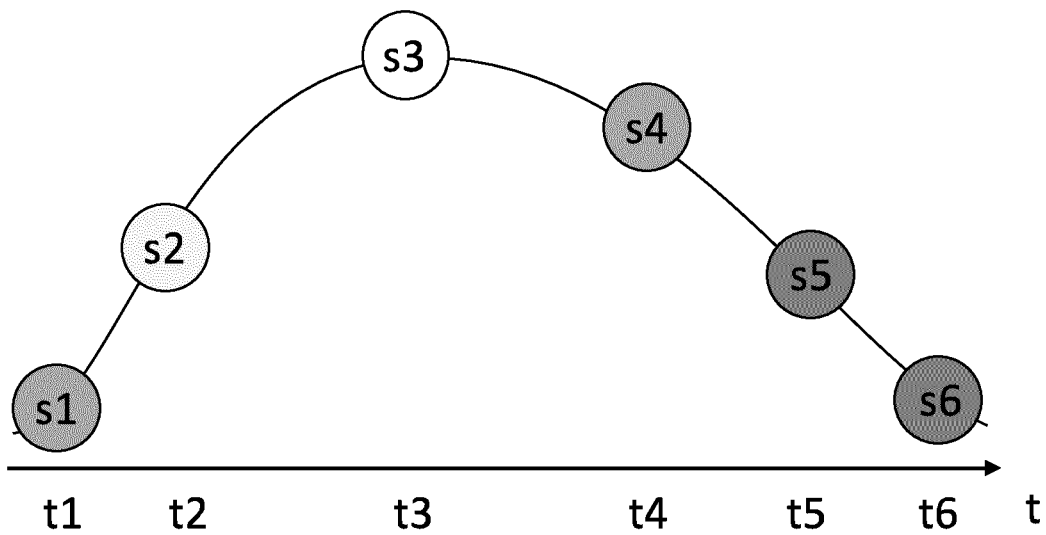

FIG. 3a illustrates a sequence of light settings s1-s6 (e.g. a sequence of light settings corresponding to the colors of the rainbow, or a sequence of light settings with the same color but with a decreasing intensity). A user may, for example, associate a light setting with a moment in time. These associations may then be stored in a memory, for instance in a look-up table such as Table 1.

The light settings of the predefined sequence of light settings may be defined based on an analysis of historical light setting control. Historical user data may be logged to determine favorite or preferred light settings at certain moments in time. These favorite or preferred light settings may then be associated with these moments in time, and these associations may then be stored in a memory, for instance in a look-up table. This may be based on historical light setting selection patterns of the user.

The processor 106 may be configured to select the subsequent light setting (only) if the subsequent signal has been received within a predefined time period after the first signal has been received. In other words, the subsequent light setting is selected (only) if the user provides the subsequent user input within the predefined time period. This period may, for example, be 1000 ms, 2000 ms, 5000 ms, etc. Such a time period may be beneficial if the number of user input elements is limited, for instance when the subsequent light setting is to be selected with the same user input element as the first light setting. When the subsequent user input may be received via a second user input element (e.g. a button) different from the first user input element (e.g. a presence/motion sensor), the time period may be longer, e.g. minutes or hours.

The processor 106 may be further configured to select a second light setting from the predefined sequence of light settings when the subsequent signal has been received after the predefined time period. The selection of the second light setting is based on the time when the subsequent signal has been received. Thus, if the user does not provide the subsequent user input within the predefined time period, the processor may select a light setting based on the (new) time (of day) at which the subsequent user input has been received. Alternatively, the processor 106 may be further configured to deactivate the light setting (i.e. switching the light source 110 off) when the subsequent signal has been received after the predefined time period.

Figure 4:
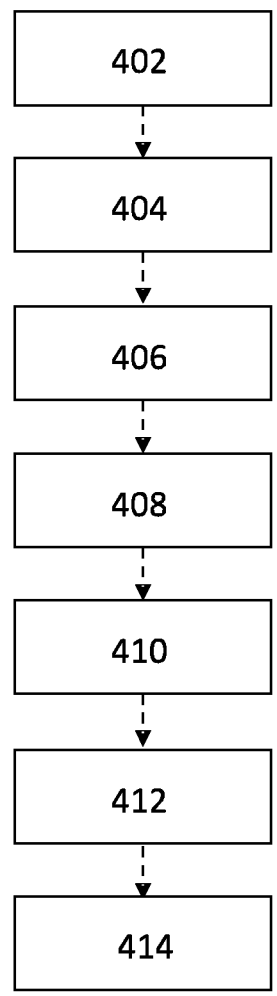
FIG. 4 shows schematically a method of controlling a light source.

FIG. 4 shows schematically a method 400 of controlling a light source 110. The method comprises the steps of: determining 402 a current time, receiving 404 a first signal indicative of a first user input, selecting 406 a light setting from a predefined sequence of light settings when the first signal has been received, wherein the selection of the light setting is based on the current time, controlling 408 the light source according to the selected light setting, receiving 410 a subsequent signal indicative of a subsequent user input, selecting 412 a subsequent light setting from the predefined sequence of light settings when the subsequent signal has been received, wherein the subsequent light setting is a light setting subsequent to the light setting, and controlling 414 the light source according to the subsequent light setting.

The method 600 may be executed by computer program code of a computer program product when the computer program product is run on a processing unit of a computing device, such as the processor 106 of the lighting controller 102.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer or processing unit. In the device claim enumerating several means, several of these means may be embodied by one and the same item of hardware. The mere fact that certain measures are recited in mutually different dependent claims does not indicate that a combination of these measures cannot be used to advantage.

Aspects of the invention may be implemented in a computer program product, which may be a collection of computer program instructions stored on a computer readable storage device which may be executed by a computer. The instructions of the present invention may be in any interpretable or executable code mechanism, including but not limited to scripts, interpretable programs, dynamic link libraries (DLLs) or Java classes. The instructions can be provided as complete executable programs, partial executable programs, as modifications to existing programs (e.g. updates) or extensions for existing programs (e.g. plugins). Moreover, parts of the processing of the present invention may be distributed over multiple computers or processors or even the 'cloud'.

Storage media suitable for storing computer program instructions include all forms of nonvolatile memory, including but not limited to EPROM, EEPROM and flash memory devices, magnetic disks such as the internal and external hard disk drives, removable disks and CD-ROM disks. The computer program product may be distributed on such a storage medium, or may be offered for download through HTTP, FTP, email or through a server connected to a network such as the Internet.

The invention claimed is:

1. A lighting controller for controlling a light source, the lighting controller comprising:
   an input for receiving signals indicative of user inputs,
   a processor configured to determine a current time of day,
      select a light setting from a predefined sequence of light settings when a first signal indicative of a first user input has been received, wherein each of the predefined sequence of light settings is associated with a time of day, wherein the selection of the light setting is based on the current time of day,
      control the light source according to the selected light setting, and
      select a subsequent light setting from the predefined sequence of light settings when a subsequent signal indicative of a subsequent user input has been received, wherein the subsequent light setting is a light setting subsequent to the light setting, and
      control the light source according to the subsequent light setting, wherein the light settings of the predefined sequence of light settings correspond to a predefined circadian light cycle.

2. The lighting controller according to claim 1, wherein the first user input and the subsequent user input have been received via the same user input element.

3. The lighting controller according to claim 2, wherein the user input element is a button.

4. The lighting controller according to claim 1, wherein the first user input has been received via a first user input element, and wherein the subsequent user input has been received via a second user input element.

5. The lighting controller according to claim 4, wherein the first user input element is a button, and wherein the second user element is a rotary button.

6. The lighting controller according to claim 1, wherein the predefined sequence of light settings is a cyclic sequence of light settings.

7. The lighting controller according to claim 1, wherein the light settings of the predefined sequence of light settings are defined by a user.

8. The lighting controller according to claim 1, wherein the light settings of the predefined sequence of light settings are defined based on an analysis of historical light setting control.

9. The lighting controller according to claim 1, wherein the processor is configured to select the subsequent light setting if the subsequent signal has been received within a predefined time period after the first signal has been received.

10. The lighting controller according to claim 9, wherein the processor is further configured to select a second light setting from the predefined sequence of light settings when the subsequent signal has been received after the predefined time period, wherein the selection of the second light setting is based on the time of day when the subsequent signal has been received.

11. The lighting controller according to claim 9, wherein the processor is further configured to deactivate the light setting when the subsequent signal has been received after the predefined time period.

12. A user input device comprising:
    the lighting controller of claim 1, and one or more user input elements configured to receive the user inputs.

13. A method of controlling a light source, the method comprising:

determining a current time of day, receiving a first signal indicative of a first user input, selecting a light setting from a predefined sequence of light settings when the first signal has been received, wherein each of the predefined sequence of light settings is associated with a time of day, wherein the selection of the light setting is based on the current time of day, controlling the light source according to the selected light setting, receiving a subsequent signal indicative of a subsequent user input, selecting a subsequent light setting from the predefined sequence of light settings when the subsequent signal has been received, wherein the subsequent light setting is a light setting subsequent to the light setting, and controlling the light source according to the subsequent light setting, wherein the light settings of the predefined sequence of light settings correspond to a predefined circadian light cycle.

14. A non-transitory computer program product for a computing device, the computer program product comprising computer program code to perform the method of claim 13 when the computer program product is run on a processing unit of the computing device.

\* \* \* \* \*